United States Patent [19]

Thurston

[11] 4,072,113
[45] Feb. 7, 1978

[54] SHIFTABLE ANCHOR ASSEMBLY

[76] Inventor: Harold H. Thurston, P.O. Box 57, Yerington, Nev. 89447

[21] Appl. No.: 704,732

[22] Filed: July 28, 1976

[51] Int. Cl.² .......................... B60P 7/04; B60P 7/08; B61D 45/00; F16B/45/00
[52] U.S. Cl. ............................... 105/484; 24/115 K; 24/230.5 R; 105/485; 280/179 R; 403/117
[58] Field of Search .......................................... 24/115K; 24/230.5; 105/475, 485, 484; 182/94; 280/179 R; 403/104, 109, 116, 117; 294/82

[56] References Cited
U.S. PATENT DOCUMENTS

| | | | |
|---|---|---|---|
| 2,179,173 | 11/1939 | Boomgarden | 182/94 X |
| 3,043,550 | 7/1962 | Garbarino et al. | 105/475 |
| 3,076,263 | 2/1963 | Musto | 403/104 X |
| 3,223,375 | 12/1965 | Bernasconi | 105/475 |
| 3,298,652 | 1/1967 | Burdick | 105/484 |
| 3,351,356 | 11/1967 | Clark et al. | 280/179 R |
| 3,357,670 | 12/1967 | Larson | 105/475 |
| 3,371,951 | 3/1968 | Bryant | 294/82 R |
| 3,950,010 | 4/1976 | Robertson | 280/179 R |

Primary Examiner—Drayton E. Hoffman
Assistant Examiner—Howard Beltran
Attorney, Agent, or Firm—Herbert C. Schulze

[57] ABSTRACT

A cargo tie down anchor unit which can be attached to automotive vehicles, or the like, featuring a slideable anchoring element which can be retracted into the anchor unit housing wherein the slideable anchoring element is positioned out of sight when not in use.

12 Claims, 9 Drawing Figures

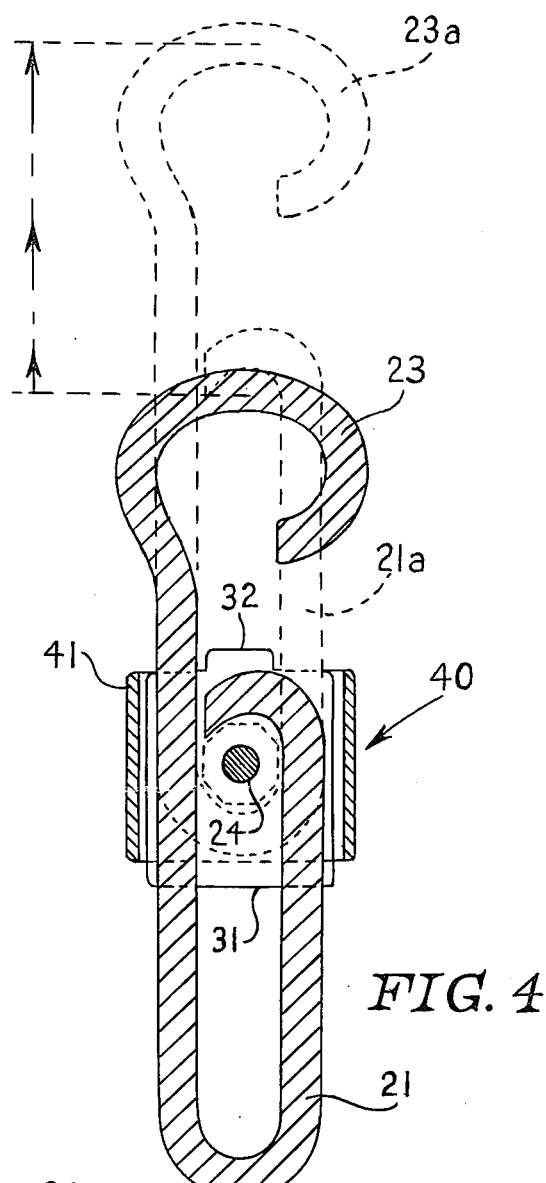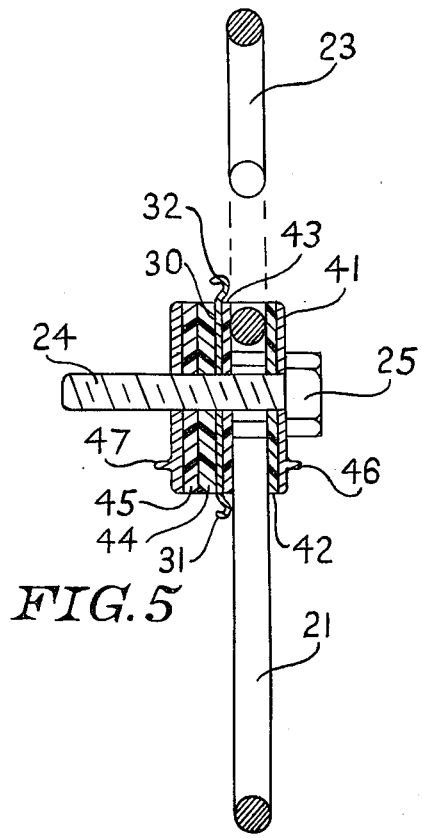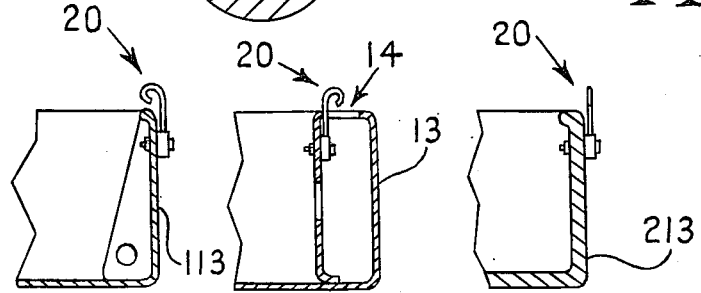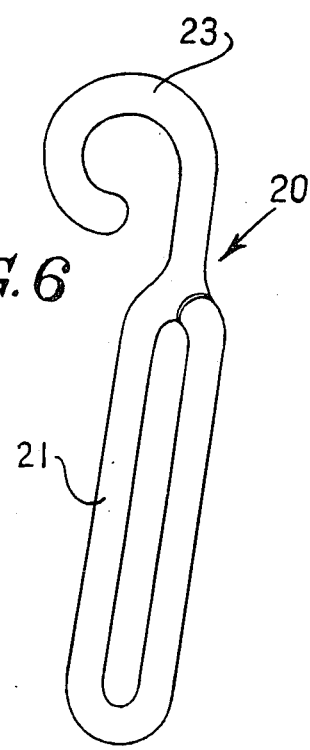
FIG. 4  FIG. 5  FIG. 6  FIG. 7  FIG. 8  FIG. 9

SHIFTABLE ANCHOR ASSEMBLY

CROSS REFERENCE TO RELATED PATENT APPLICATIONS

There are no patent applications filed by me related to this patent application.

BACKGROUND OF THE INVENTION

1. FIELD OF THE INVENTION

This invention is in the general field of cargo anchoring devices for the tying down of cargo and is more particularly directed to vehicles, or the like, where it is preferred that a fixed position anchoring element be located only in certain positions so that the element will not interfere with normal usage of the vehicle. The retractable capability of the anchoring element will allow the anchoring unit to be placed in numerous locations on the vehicle since the anchoring element can be retracted when not in use.

2. DESCRIPTION OF THE PRIOR ART

There are numerous types of cargo tie down, or anchoring devices including flush mounted units, stationary rings, hooks, and the like. Those skilled in the art are familiar with numerous types of tie down or anchoring devices and these devices essentially protrude above the surface upon which they are used. The result of such a protrusion is that the hook or loop shaped anchor element will interfere with normal use of the vehicle. There are certain flush mounted devices but the installed cost is excessive and the functional use is limited.

I have solved this problem by use of an anchoring device which contains a slideable anchoring element that can be placed in a position which is flush with a surface where the anchoring device is to be used. Therefore, the retracted anchoring element cannot be considered an undesirable obstruction. I have designed a unique and economical structure which allows for retraction of the cargo anchoring device.

SUMMARY OF THE INVENTION

The common cargo tie down device which is installed on a vehicle, or the like, will constitute an undesirable obstruction when there is not an immediate need or use for the device. Most tie down anchoring elements are of a hook like configuration and hold a rope, or the like, in place so that cargo can be secured to a vehicle. This anchoring element protrudes above the surface where the anchoring element is to be used and the anchoring element can easily interfere with normal use of the vehicle. When using the vehicle, one's person or clothing may come in contact with the anchoring element and can cause injury to the person or damage to his clothing. Also, the anchoring element could interfere with normal loading and unloading of cargo to the extent that the anchoring element can become a definite obstruction.

I have overcome this problem by the use of a retractable anchoring element wherein the anchoring element, which is housed within an anchoring device housing, can be placed in a position flush to the surface where the anchoring device is to be used.

The present invention features a housing through which an anchoring element is freely slideable. The housing contains a threaded bore which will accept a threaded bolt, the bolt being used to fasten the housing to a vehicle and also being used to prevent the anchoring element from being pulled out of, or pushed fully into, the housing.

The housing unit contains an inner lining of plastic, or the like, so as to reduce friction between the slideable anchoring element and the housing. Also, contained within the housing unit are metal clips which will exert a pressure against the slideable anchoring element and the clips will also hold the retractable anchor element in a fully extended or in a fully retracted position.

It is an object of this invention to provide a cargo anchoring element which is slideably retractable within a cargo anchoring device, said device being affixed to a vehicle or the like;

Another object of this invention is to provide an inner lining on a cargo anchoring device housing so as to reduce friction between the slideable anchoring element and the housing; and, It is another object of this invention to provide clips on the interior of the cargo anchoring device housing so as to exert a pressure against the slideable anchoring element and also to hold the retractable anchor element in a fully extended or in a fully retracted position.

The foregoing and other objects and advantages of this invention will become clear to those skilled in the art upon reading the description of a preferred embodiment, which follows.

BRIEF DESCRIPTION OF THE DRAWINGS

FIG. 4 is a front cross-section view taken on section lines 4—4 of FIG. 3 and also showing the slideable characteristics of the retractable anchor element;

FIG. 5 is a side cross-section view taken on section lines 5—5 of FIG. 2;

FIG. 6 is a perspective view of a retractable cargo anchoring element; and

FIG. 7, 8 and 9 show a partial cross-section of the bed of a pickup truck displaying the retractable cargo tie down anchor unit attached to the vehicle.

DESCRIPTION OF A PREFERRED EMBODIMENT

Figure 1:
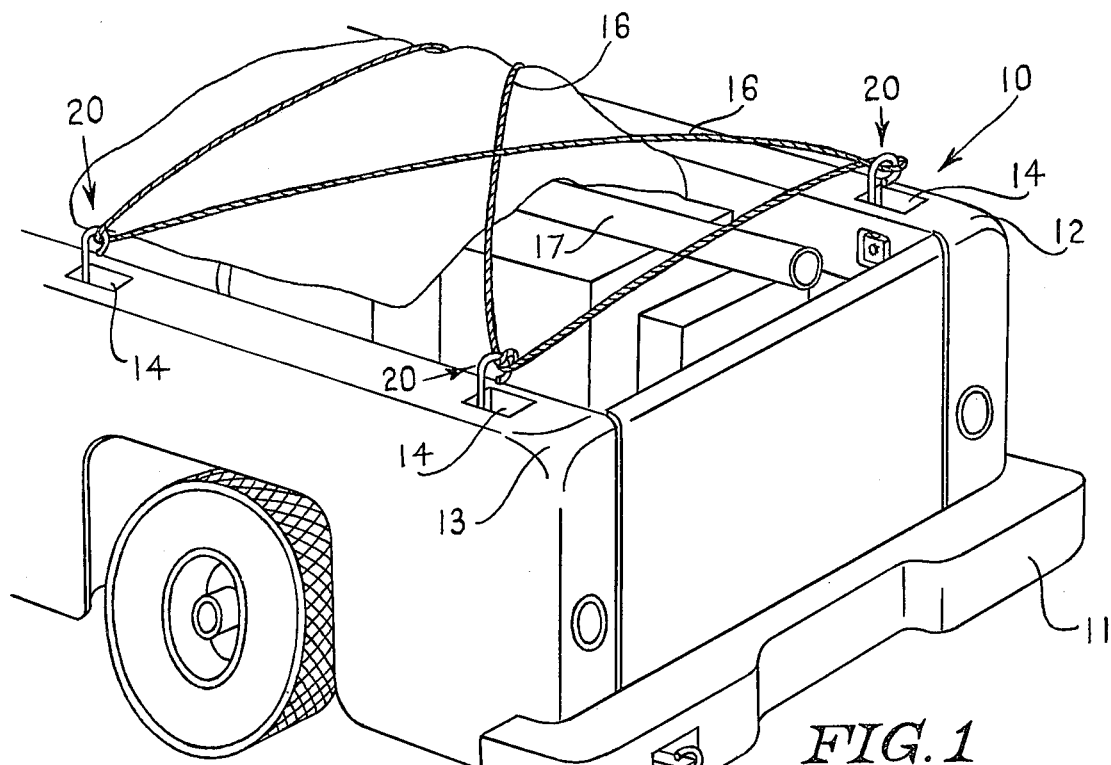
FIG. 1 is a partial perspective view of the bed of a pickup truck showing the retractable cargo tie down anchor.

In FIG. 1, there is shown the rear portion of a pickup truck, generally 10, which is carrying cargo 17. The cargo is held in place by ropes or the like 16, and the ropes are anchored to the pickup at well 14 or even in the rear bumper 11 at well 15. The means for fastening the tie down anchor unit to the vehicle is by use of a bolt, or the like, 24, 25, see FIG. 3. By reference to FIG. 1, side 12 of the vehicle displays the tie down anchor unit fastened at well 14.

FIGS. 7, 8 and 9 will display some of the various ways to fasten the tie down anchor unit to the vehicle. These figures also illustrate the fact that the hook ends of the anchor unit are such that the hook can be designed to point in various directions when fastened in well 14 or when fastened to the outside of the vehicle as shown at 113 or 213.

Figures 2, 3:
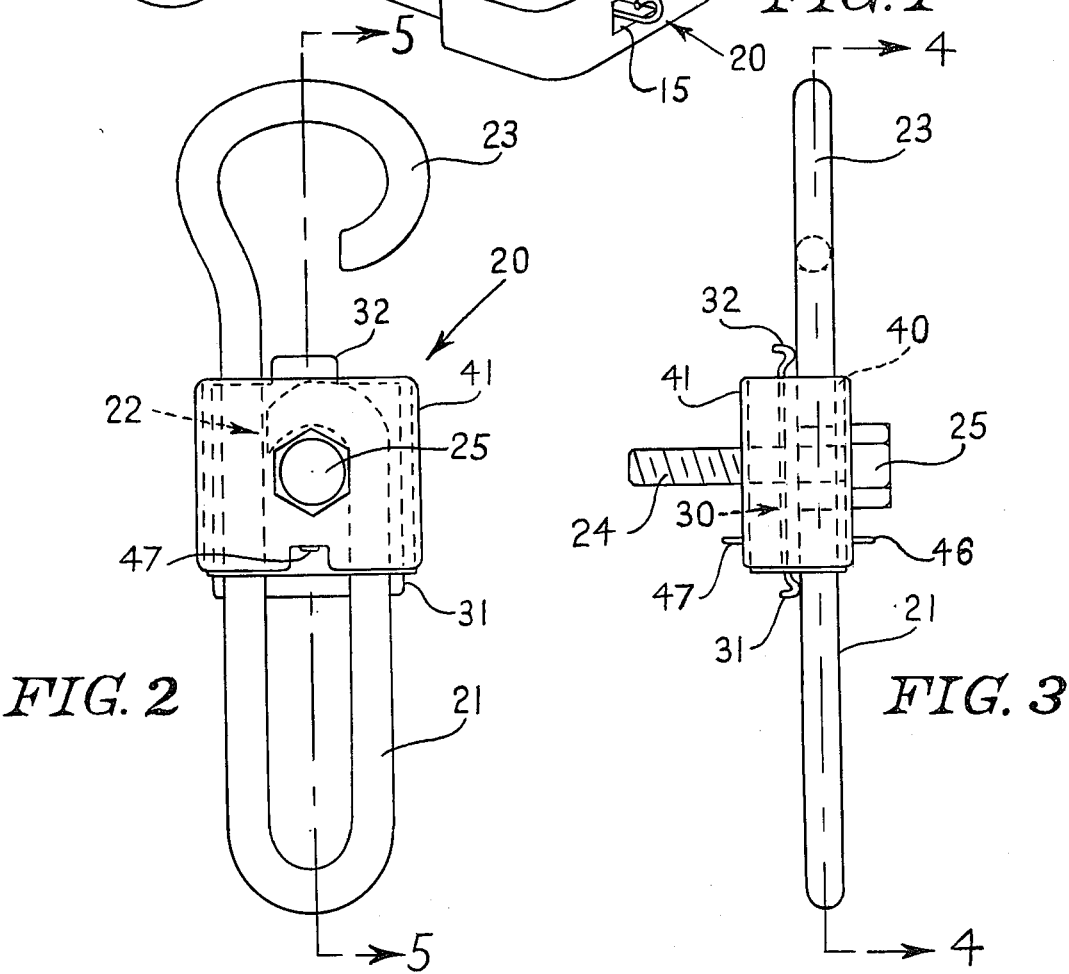
FIG. 2 is a front view of the retractable cargo tie down anchor and also showing phantom details.
FIG. 3 is a left side view and also showing phantom details.

With reference to FIGS. 2-6, the elements will be shown in detail. The retractable cargo tie down anchor unit contains a one piece element 20, see FIG. 6. This element is constructed out of a rod of metal, or the like, and bent to a desirable configuration as seen in FIGS. 2 and 6. Another configuration, not shown, can be strictly oval as could be pictured if the top loop 23 and the neck were removed from FIG. 6.

The anchor element is freely slideable, see 23, 23a in FIG. 4, within the housing element 40. The housing element is constructed out of metal or the like and contains sides 41, see FIGS. 3-5. Contained within the housing element is a lining of plastic, or the like, 42-45, and the purpose for said lining is to assist in decreasing friction between the housing element and the slideable anchor element. Also contained within the housing element is a spring type clip 30, containing ends 31 and 32, FIG. 5, constructed of metal or the like. The purpose of the clip is to always exert some pressure on the anchor element and to also hold the anchor element in either a fully retracted position or in a fully extended position. By reference to FIG. 4, it can be seen that if the anchor element is fully extended 21a, 23a, the clip end 31 will snap inward, see FIG. 5, as the bottom loop portion 21 of anchor element 20 moves upward beyond clip end 31, therefore the element will be held in an extended position and some force will be required to lower the anchor element 20. Note that bolt 24, 25 will limit the extent to which element 20 can be raised since the lower loop at 21 will engage the threaded shaft 24. When the anchor element 20 is lowered into a fully retracted position, see FIG. 4, the upper loop at 21 will pass below clip end 32, see FIG. 5, and the clip will snap inward and the element will be held in a retracted position wherein force will be required to raise the anchor element 20. Note that bolt 24, 25 will limit the extent to which element 20 can be lowered since the upper loop at 21 will engage the threaded shaft 24.

The housing element 40 contains a threaded bore so as to receive threaded bolt 24, 25 and the bolt has two functions. One function is to limit the movement of anchor element 20 and the other function is for securing the anchor unit to a vehicle or the like. Note that the anchor unit is not necessarily limited to use in automotive vehicles and also note that the anchor unit can be placed in various locations. After drilling a hole at an appropriate location, the bolt is inserted in that hole and affixed within the housing element 40. The unit is always positioned in such a manner that when anchor element 20 is fully retracted the hook portion 23 will be below or at least flush with, that surface above which the hook will be extended.

Since the housing element 40 could possibly rotate about the axis of bolt 24, 25 sharp protrusions 46 or 47, see FIGS. 3 and 5, will be embedded into an adjacent wall and prevent any pivotal movement of the housing element. Additionally, the housing element could have more than one threaded bore and more than one anchor bolt would prevent pivotal movement of the housing element.

It will be obvious to those skilled in the art that various modifications of the invention may be resorted to within the scope of the claims.

I claim:

1. A slideably extendable and retractable anchoring device comprising:
   1. An housing comprising a rectangular hollow member;
   2. An elongated anchoring element slideably located within said housing, said anchoring element comprising a hook extending outside of said housing, with an extension on said hook having a closed ended slot located within said extension slideably mounted within said housing; and (3) Means to affix the said housing to a desired location, said means comprising a fastening member passing through said housing and said slot in such manner that the fastening member limits the extent of movement of the anchoring element.

2. The device of claim 1 wherein the interior of the housing is lined with a material which will reduce friction when the anchoring device is slideably extended or retracted with relation to the housing.

3. The device of claim 1 wherein means is employed to prevent the housing from movement about said means to affix the housing to a desired location.

4. The device of claim 1 wherein a tension means is used so that some force is necessary to extend and retract said anchoring element.

5. The device of claim 1 wherein a tension means is used to hold the anchoring element in either a fully retracted or a fully extended position so that some force is necessary to return the anchoring element from either a fully extended or a fully retracted position.

6. A slideably extendable and retractable anchoring device comprising: a housing, said housing being open at opposite ends and containing an open channel therethrough, and said housing containing a hole which passes through said housing from front to rear of said housing, the hole also being at right angles to a plane of the channel; an anchoring element which will freely slide into and out of the open channel, the said housing to a desired location, said means will cooperate with the hole in said housing so as to affix said housing to the desired location and said means will pass through said closed ended elongated opening in the anchoring element so as to limit distance through which the anchoring element can slide into and out of said housing.

7. The device of claim 6 wherein the open channel portion of said housing is lined with a material which will reduce friction between the moveable anchoring element and said housing.

8. The device of claim 6 wherein means is employed to prevent the housing from movement about said means to affix the housing to a desired location.

9. The device of claim 6 wherein a tension means is used so that some force is necessary to extend and retract said anchoring element.

10. The device of claim 6 wherein a tension means is used to hold the anchoring element in a position so that some force is necessary to return the anchoring element from a position.

11. An anchoring device comprising: (1) A hollow rectangular housing; (2) An elongated rod formed in such manner as to form a closed ended elongated enclosure on one end having an opening therein, and slideably mounted within said housing, and having hook means fastened on the other end at a distance from the enclosure; and (3) Means to mount said housing upon a surface, said means comprising a member passing through two sides of the housing and through the opening in the rod means slideable within said housing.

12. The apparatus of claim 11, wherein said housing is provided with at least one protruding member cooperative with the surface upon which said housing is mounted in such manner as to penetrate said surface to prevent any pivotal movement of the housing element.

* * * * *